Sept. 13, 1960 P. J. KIRCHER 2,952,759
PROTECTIVE DEVICE FOR APPLIANCES
Filed Aug. 22, 1958

INVENTOR
PAUL J. KIRCHER
BY
*Lindsey and Prutzman*
ATTORNEYS

United States Patent Office 2,952,759
Patented Sept. 13, 1960

2,952,759
PROTECTIVE DEVICE FOR APPLIANCES

Paul J. Kircher, Plainville, Conn., assignor to Landers, Frary & Clark, New Britain, Conn., a corporation of Connecticut Filed Aug. 22, 1958, Ser. No. 756,609
4 Claims. (Cl. 200—136.5)

This invention relates to improvements in electrical appliances of the type in which a liquid is heated, with particular reference to coffee and tea makers, vaporizers and sterilizers and the like.

A major object is to provide an improved thermostatically operable device which will not only disconnect the heating element of such an appliance from the power source when dry of liquid, thus preventing damage to the appliance, but it also compels the user to perform a positive act, such as to disconnect the plug from the appliance to effect reset for subsequent use.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
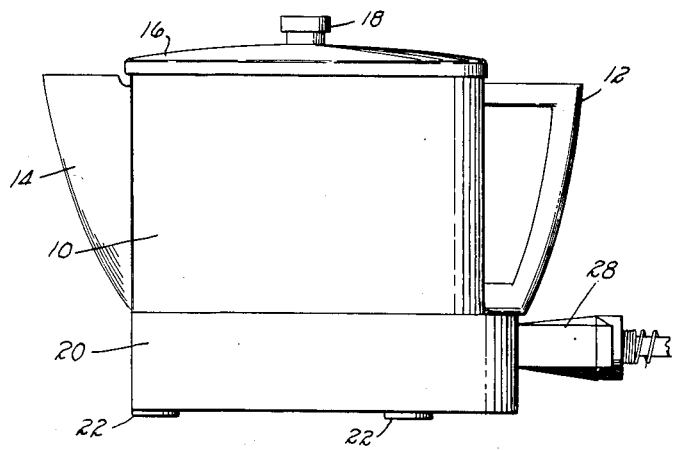
Fig. 1 is a side elevational view of a coffee maker incorporating a preferred embodiment of the invention.

The coffee maker shown in Fig. 1 includes a liquid vessel 10 having the conventional handle 12, spout 14, and cover 16 removable by knob 18. Vessel 10 is supported on bottom 20 provided with heat insulating feet 22, the bottom 20 being apertured (not shown) to permit a pair of fixed plug contacts 24, 26 (Fig. 2) to extend outwardly thereof to receive a conventional appliance cord set including the receptacle or plug 28.

Figure 2:
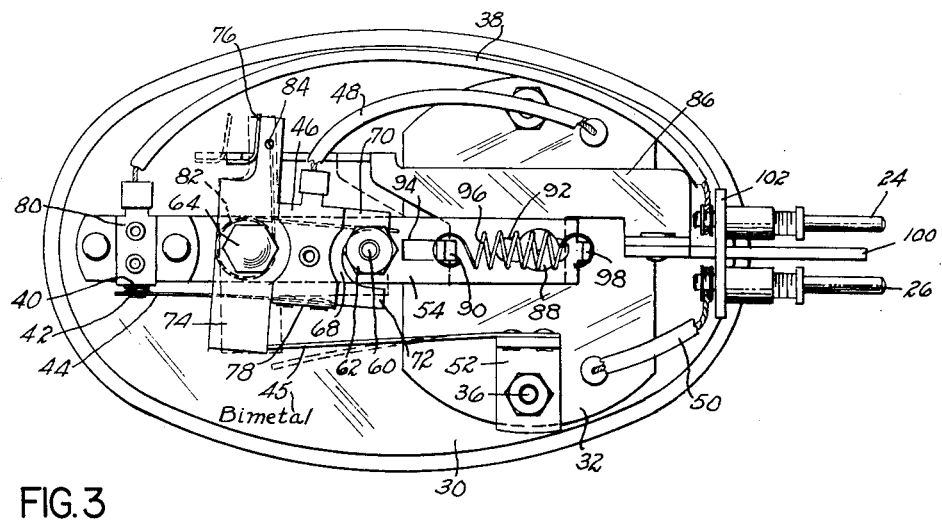
Fig. 2 is an enlarged bottom plan view of the coffee maker of Fig. 1 with the base removed therefrom to expose a thermostatically controlled protective mechanism incorporating the invention.
Figure 3:
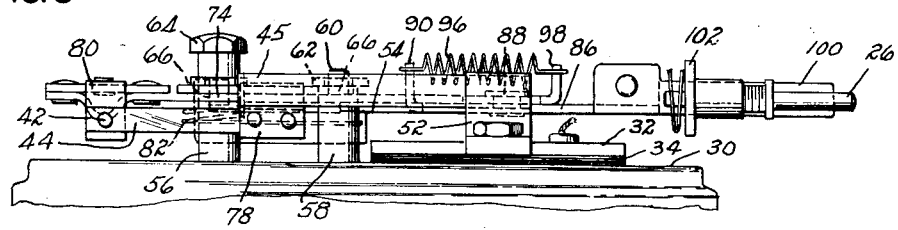
Fig. 3 shows in side elevation the protective mechanism of Fig. 2 with the supporting vessel inverted.

Referring to Figs. 2 and 3, the bottom wall 30 of vessel 10 has mounted thereon a heavy heat storing metallic plate 32 spaced from surface 30 by several sheets of mica 34. Between two of these sheets is disposed a resistive electrical heating element (not shown) which is clamped between plate 32 and vessel 10 by bolts 36. The heating element is energized by a circuit running from contact 24, through conductor 38 to contacts 40 and 42 (when closed), through contactor arm 44, connector strip 46 and conductor 48 to the heating element whose other end is directly connected to contact 26 by conductor 50.

Plate 32 is a substantial mass of a good heat conducting metal and thus is subject to uniform heating during energization of the heating element. Bimetallic arm 45 extends parallel to surface 30 and is supported at one end by a bracket 52 preferably of a good heat conducting material such as copper, clamped directly to plate 32 by bolt 36, the other end of arm 45 being free to deflect from the solid to the dotted line position of Fig. 2 when heated.

Bottom wall 30 of vessel 10 also provides support for an elongate mounting bracket 54 clamped to posts 56 and 58 by nuts 62 engaging bolts 60. A cap nut 64 locks the nut on the bolt extending through post 56. Each nut 62 has a depending integral shank 66 of reduced diameter. One provides a bearing surface above the post 56 for the pivotal mounting of a T-shaped insulator 68 on post 56 and the other provides stop surfaces on post 58 to limit the oscillation of the insulator about its bearing. Insulator 68 includes a body portion extending along bracket 54, the free end of which defines spaced arms 70, 72 for contact with either side of nut shank 66 on post 58 to limit the movement of insulator 68 from the heavy to the dotted positions shown in Fig. 2.

Side 74 of the T of insulator 68 serves as a sear engageable with bimetallic arm 45, and the opposite side, of reduced width, is engageable by a lug 76 for retention of the insulator in the heavy line position of Fig. 2 when the switch is in protective position as hereinafter described. An electrical terminal strip 46 is riveted to insulator 68 and has a side bracket 78 to which switch contactor arm 44 is riveted to extend parallel to vessel surface 30 with contact 42 engageable with contact 40 as positioned by bracket 80. A wire spring 82 is looped around post 56 and has one end anchored to insulator 68 at 84 and its other end engaging post 58 so as to urge insulator 68 toward the dotted line position of Fig. 2.

Lug 76 is carried by and movable between the heavy and dotted line positions by slide arm 86 which is supported and guided for sliding movement by loose rivet 88 and guy lug 90 disposed in elongated apertures 92 and 94 of bracket 54. Coil spring 96 is held under tension between guy lug 90 and bent-up tab 98 of bracket 54 to bias slide arm 86 (and therefore lug 76) in the heavy line position of Fig. 2. Slide arm 86 also carries a plunger 100 which extends through a suitable aperture in insulating contact support plate 102 which is fixed to bottom 20 (not shown). As plunger 100 is moved inwardly by attachment of receptacle 28 to contacts 24 and 26, slide arm 86 moves lug 76 to the dotted line position of Fig. 2.

The operation of the device will be apparent from the following explanation. Assuming vessel 10 is properly filled with liquid and receptacle 28 is plugged in, plunger 100 will be pushed in to move lug 76 to its dotted position. At this time bimetal arm 45 is in its heavy line position engaging the side of sear 74 and spring 82 is prevented from rotating insulator 68 to open contacts 42 and 44. Thereupon, the liquid is heated by the heating element which is energized through the previously described circuit. When the vessel runs dry, plate 32 is rapidly heated above normal temperature with heat being conductively transmitted to arm 45 which remains in the heavy line position during normal heating of the device, but deflects to the dotted position of Fig. 2 under excessive heat. As the end of arm 45 clears sear 74, insulator 68 rotates to the dotted position to swing contactor arm 44 in a direction to break the circuit between contacts 40 and 42, thus de-energizing the heater element. As arm 45 cools, the end of sear 74 serves as a stop to prevent its return to the heavy line position, hence contacts 40 and 42 remain open and the heating element is not re-energized.

The only way in which the contacts 40 and 42 can be closed is by pulling fixture 28 to allow plunger 100 to again move outward under urge of spring 96 and draw lug 76 back to the heavy line position, with attendant clock-wise rotation of insulator 74 and return of arm 45 to the heavy line positions. It is thus seen that the device, once activated by an abnormal temperature rise cannot be inadvertently reset. It is common practice to switch off a utensil of this type either by throwing an outlet controlling switch or by pulling the plug from a wall outlet and it is not unusual to reconnect an appliance to the power source in the same manner without knowledge that the appliance is dry of liquid. Neither practice is effective to re-energize the heating element, hence the user is alerted to the condition of the utensil and is compelled to actually pull fixture 28 clear of the receptacle plug before the utensil can be reheated.

As will be apparent to persons skilled in the art, various modifications and adaptations of the structure above described will become readily apparent without departure from the spirit and scope of the invention, the scope of which is defined in the appended claims.

I claim:

1. In a thermo-responsive switch, a fixed contact and a movable contact, a member mounted for oscillation, a contactor arm fixed to said member and supporting said movable contact for movement between open and closed contact positions, means biasing said member toward an open contact position, a heat distortable element engaging and normally maintaining said member in closed contact position, said element being distorted by a predetermined temperature to move out of engagement with said member and permit contact opening, a stop biased into engagement with said member to prevent oscillation thereof, and means for holding said stop clear of said member to permit oscillation thereof into a contact opening position in response to heat distortion of said element.

2. In a thermo-responsive switch, a fixed contact and a movable contact, pivot means for carrying said movable contact between closed and open contact positions, a sear associated with said pivot means and movable therewith, means urging said pivot means toward the open contact position, a heat responsive member engageable with said sear and positioned to distort from a position maintaining said sear in a closed contact position to a position of disengagement therewith to permit contact opening, stop means to prevent said pivot means from opening the contacts when said heat responsive member is disengaged from said sear, and a plunger associated with said stop mean to inactivate said stop means and permit contact opening upon movement of said heat responsive member to a position disengaged from said sear.

3. In a coffee maker or the like, including a pair of spaced electrical terminals for energizing the coffee maker, a resettable protective switch comprising a plunger positioned adjacent the contacts and movable by an appliance energizing receptacle, means outwardly biasing said plunger toward the energizing receptacle, a fixed contact and a movable contact, pivot means for controlling said movable contact between closed and open contact positions, a sear associated with said pivot means, a spring urging said pivot means toward an open contact position, a thermal responsive element positioned to engage said sear and maintain said contacts closed against the urge of said spring during normal operating temperatures and to move out of sear engagement to permit said contacts to open in response to abnormal operating temperatures, and means associated with said plunger and engageable with said pivot means to prevent contact opening when said plunger is in the outwardly biased position, said last mentioned means being inactivated by movement of said plunger by attachment of the energizing receptacle to permit opening of said contacts in response to movement of said thermal responsive element out of engagement with said sear.

4. The resettable protective switch as set forth in claim 3 wherein said plunger is positioned intermediate the spaced contacts and is movable in a direction generally parallel to the contacts.

References Cited in the file of this patent

UNITED STATES PATENTS

| | | |
|---|---|---|
| 2,256,537 | Wulle | Sept. 23, 1941 |
| 2,478,541 | McCracken | Aug. 9, 1949 |
| 2,519,432 | Brown | Aug. 22, 1950 |

FOREIGN PATENTS

| | | |
|---|---|---|
| 640,318 | Great Britain | July 19, 1950 |